March 3, 1959 J. P. WESTON 2,876,293
GROUP ALARM COMMUNICATION CIRCUIT
Filed Dec. 6, 1956
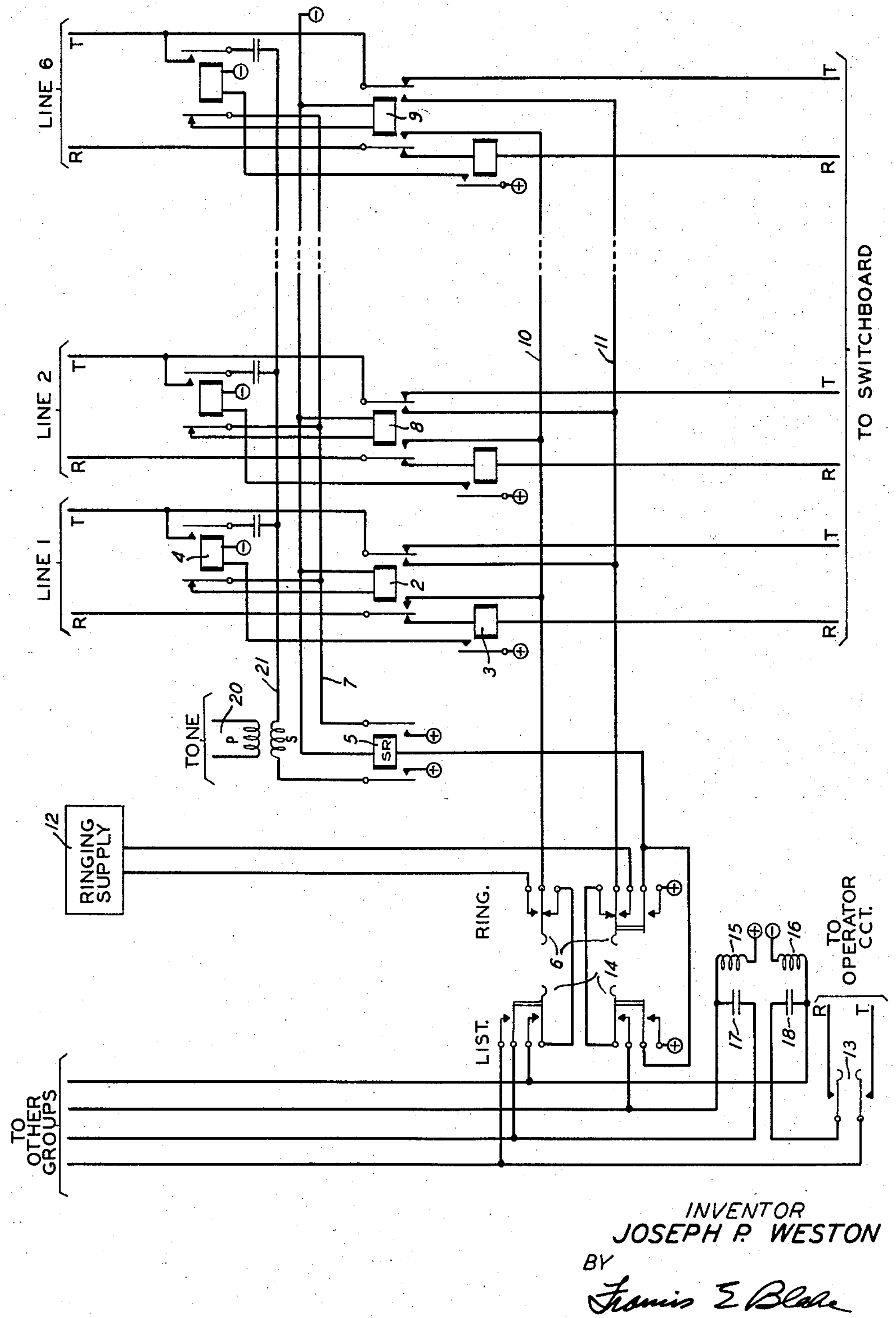
INVENTOR
JOSEPH P. WESTON
BY
Francis E. Blake
ATTORNEY United States Patent Office 2,876,293

Patented Mar. 3, 1959

2,876,293

GROUP ALARM COMMUNICATION CIRCUIT

Joseph P. Weston, Rochester, N. Y., assignor to General Dynamics Corporation, Rochester, N. Y., a corporation of Delaware Application December 6, 1956, Serial No. 626,758

4 Claims. (Cl. 179—51)

This invention relates to signalling systems and particularly to means in a telecommunication system for providing group alarm service.

The object of the invention is to provide circuitry whereby the busy condition of one or more lines of a group will not interfere with the transmission of alarm signals to either the idle lines of the group or those which are busy.

The system consists of a group of lines such as telephone lines extending from individual subscribers' premises to a switchboard where such lines may be interconnected for communication purposes. Each such line traverses a group alarm circuit much in the nature of a conference call circuit where under the control of an operator all lines may be cut off from the switchboard and thereupon connected to a source of signalling current or a common talking circuit.

The system is an improvement over conventional prior art systems such as that shown, by way of example, in the Kiner patent, 2,374,357 issued April 24, 1945, being characterized by economy of apparatus and simplification of operation.

The invention consists of the provision of means individual to each line which will operate in response to the establishment of a group alarm connection to first prevent the connection of a busy line to the alarm connection, whereby the alarm signalling current will not be dissipated in a busy line circuit and thereby weakened so that idle lines cannot be signalled and second to connect an alternative and different type signalling current to such busy lines.

A feature of the invention is an individual line circuit for each line of a group alarm system having a line relay for maintaining a telephone connection over a group alarm operation, a cut off relay for cutting off the line, when idle, from the normal telephone circuits and a third relay responsive to group alarm operation for placing an alternative signal on a busy line and for preventing the operation of the cut off relay if the alarm operation takes place after the line has been taken for telephone purposes.

Another feature of the invention is a means for successively removing lines responding to alarm signals from the alarm signal circuit so that they will not interfere with further signalling of other stations which have not responded. Generally the operation of the alarm signal key is in a series of operations in accordance with a code. While the alarm key is operated, if a station answers, it places a bridge across the alarm signal circuit which may dissipate sufficient signal current to weaken the further signalling of other lines on which no response has been had. However, each time the master alarm signal key is restored even for a short interval the line relays of all the lines which have responded will pick up so that upon the following operation of the master signal key the alternative (tone) signal will be transmitted to such lines and the low impedance bridge provided by the answering line or lines will be lifted from the ringing supply leads.

Another feature of the invention is a source of tone which may be applied in code to all busy lines by the coded operation of a master ringing key and maintained steadily connected to such busy lines thereafter by the master listening key, whereby a busy subscriber cannot escape notification of an emergency condition.

Any such busy subscriber may join the conference over the common emergency trunk by hanging up for an instant to allow his line supervisory relay to release, whereupon his cut off relay will immediately transfer his line from its normal connection to the line switching facilities into connection with the common emergency trunk.

Another feature of the invention is the use of a slow releasing relay under control of the said common ringing and listening keys whereby as the operator releases the ringing key and then operates the listening key he will not lose those who have answered. Since the outstanding feature of the present invention is the provision of a line supervisory relay for excluding a subscriber who has answered from the conference connection to remove the low impedance bridge therefrom, it follows that if the common relay were allowed to release during the change from the operation of the ringing to the operation of the listening key, all those who had answered would thereupon be excluded and the operator would lose the conference.

Another feature of the invention is the means provided for a unique operating feature of this arrangement. If the operator operates the ringing key intermittently then upon each release thereof those subscribers who have answered will have their line relays operated and will be thereby excluded from the conference. Each such excluded subscriber may thereafter by prearrangement or by signal and while the listening key (or the ringing key) is steadily operated, reenter the conference by a simple transitory operation of his switchhook. In other words, by coded or intermittent operation of the emergency ringing key, the operator may pick off any subscriber who may have answered during this period and exclude him from the common ringing or conference circuit.

Other features will appear hereinafter.

The drawings consist of a single sheet having a single figure in the form of a schematic circuit diagram.

In such a system a plurality of lines are normally extended to a switchboard for conventional telephone purposes. However, these lines give service to a selected personnel who are duty bound to respond to given emergency conditions. Consequently, each line of this group passes through a cut off relay which may be operated under emergency conditions to disconnect such line from its normal association with a switchboard and to connect it alternatively to a group communication circuit. The line 1, by way of example, normally extends from a subscriber's premises through the armatures and back contacts of its individual cut off relay 2 to a switchboard herein merely indicated by a label at the bottom of the figure.

Such a line is provided with a supervisory relay 3 in series therewith and which relay controls the operation of a slave relay 4, these two relays constituting a conventional arrangement wherein the relay 3 is sensitive even though it is of low impedance, and cannot carry a heavy contact spring load and the relay 4 is capable of handling such a heavier load. Thus when the line is in use under normal conditions the relay 4 is operated to open the circuit of the cut off relay 2 and thus prevent its operation when and if the group relay 5 is operated.

Should an emergency arise, an operator will act to summon the select personnel reached by this system by operating the ringing key 6. This key closes a circuit from ground through its lower contacts to operate the relay 5 and this relay through its right hand contact will ground the conductor 7 to operate in parallel all of the cut off relays such as 2, 8 and 9. These relays in turn will connect each line, such as line 1, line 2 and line 6 to the common conductors 10 and 11, now extended by the key 6 to a source of ringing current 12 whereby all the stations of this select personnel will be rung. It should be particularly noted that this personnel is instructed and trained to delay the answering of such summons as it is conventional for the operator to manipulate the key 6 in accordance with a code, whereby a certain amount of information may be transmitted by the nature of the summons and no delay will be caused by the time taken for a group conversation. However, the operator has at his commond a talking set which by key 13 may be effectively connected through the key 14 to the common conductors 10 and 11 so that further information in greater detail may be given by word of mouth.

Should line 1 be busy in an ordinary conversation at the time the key 6 or the key 14 is manipulated, then the cut off relay 2 will fail to operate and the comparatively low impedance bridge of the station set on line 1 will be excluded from the ringing circuit. At the same time a source of tone 20 is effectively connected to the conductor 21 by the left hand armature and front contact of relay 5 and connected to the individual line by the right hand armature and front contact of the slave relay 4 so that the busy called subscriber will be notified by this emergency call. If any other station answers during the code transmission, its supervisory relay will respond between applications of ringing current and thus its cut off relay, such as relay 2, will be operated to prevent the establishment of an interfering low impedance bridge across the common conductors 10 and 11.

Talking current for the stations on the various lines is provided during the listening period of key 14 by the ground and battery connections to the retardation coils 15 and 16 while a path is provided to the operator's set through the condensers 17 and 18.

As indicated, the select personnel may be divided into a plurality of groups, in accordance with functional duties or otherwise and a set of listening and ringing keys such as the keys 14 and 6 may be multipled as indicated for each such group so that the personnel may be summoned by groups and, if necessary or desirable, may be included in an overall group conversation.

It is to be particularly noted that the common relay 5 is made slow to release so that the operator may retain all those who have answered during the operation of the ringing key as he changes from the ringing to the listening key.

What is claimed is:

1. In a group alarm communication system, a plurality of individual subscriber lines extending into conventional line switching facilities, an emergency communication trunk common to said lines, a line supervisory relay included in series in each said line responsive to the busy condition thereof, a cut off relay for each said line for transferring said line from its said normal connection to said switching facilities to connection with said common communication trunk, a slave relay controlled by each said line supervisory relay for controlling each corresponding said cut off relay, a source of emergency signal current controlled by said slave relay for application to said corresponding line, an operator's circuit, a key for connecting said operator's circuit to said common communication trunk, a source of ringing current, a key for connecting said source of ringing current to said common communication trunk, a common relay controlled by said keys and means controlled thereby for operating all cut off relays of idle lines and for applying said source of emergency signal current to busy lines.

2. In a group alarm communication system, a plurality of individual subscriber lines extending into conventional line switching facilities, an emergency communication trunk common to said lines, a line supervisory relay and a cut off relay for each said line each having control over the other whereby the first to become operated prevents the operation of the other, said line supervisory relay being included in series in its said line in a section thereof between the contacts of said cut off relay and said conventional line switching facilities, said cut off relay for each said line having contacts for transferring said line from its said normal connection through said line supervisory relay to said switching facilities to connection with said common communication tunk, means controlled by each said supervisory relay for controlling each corresponding said cut off relay, a source of emergency signal current controlled by said supervisory relay for application to said corresponding line, an operator's circuit, a key for connecting said operator's circuit to said common communication trunk, a source of ringing current, a key for connecting said source of ringing current to said common communication trunk, a common relay controlled by said keys and means controlled thereby for operating all cut off relays of idle lines and for applying said source of emergency signal current to busy lines.

3. In a group alarm communication system, a plurality of individual subscriber lines extending into conventional line switching facilities, an emergency communication trunk common to said lines, a line supervisory relay and a cut off relay for each said line, each having control over the other whereby the first to become operated prevents the operation of the other, said line supervisory relay being included in series in its said line in a section thereof between the contacts of said cut off relay and said conventional line switching facilities, said cut off relay for each said line having contacts for transferring said line from its said normal connection through said line supervisory relay to said switching facilities to connection with said common communication trunk, means controlled by each said supervisory relay for controlling each corresponding said cut off relay, a source of emergency signal current controlled by said supervisory relay for application to said corresponding line, an operator's circuit, a key for connecting said operator's circuit to said common communication trunk, a source of ringing current, a key for connecting said source of ringing current to said common communication trunk, and a common relay controlled by said keys for enabling said cut off relays said mutual control circuits of said line supervisory relays and said cut off relays rendering said line supervisory relays of any line on which a subscriber has answered during an operation of either of said keys, responsive to subscriber control during a following interval when neither of said keys are operated, to prevent the reoperation of a previously operated cut off relay to prevent the transmission of ringing current to an answering subscriber's line.

4. In a group alarm communication system, a plurality of individual subscriber lines extending into conventional line switching facilities, an emergency communication trunk common to said lines, a line supervisory relay and a cut off relay for each said line, each having control over the other whereby the first to become operated prevents the operation of the other, said line supervisory relay being included in series in its said line in a section thereof between the contacts of said cut off relay and said conventional line switching facilities, said cut off relay for each said line having contacts for transferring said line from its said normal connection through said line supervisory relay to said switching facilities to connection with said common communication trunk, means controlled by each said supervisory relay for controlling each corresponding said cut off relay, a source of emergency signal current controlled by said supervisory relay for application to said corresponding line, an operator's circuit, a key for connecting said operator's circuit to said common communication trunk, a source of ringing current, a key for connecting said source of ringing current to said common communication trunk, and a slow releasing common relay controlled by said keys for enabling said cut off relays and for maintaining operated said cut off relays in operation during a normal interval in the release of said ringing key and the immediate following operation of said other key.

References Cited in the file of this patent

UNITED STATES PATENTS

| | | |
|---|---|---|
| 1,415,853 | Andrick et al. | May 16, 1922 |
| 2,298,489 | Kiner | Oct. 13, 1942 |
| 2,374,357 | Kiner | Apr. 24, 1945 |